United States Patent
Sugiyama (10) Patent No.: US 11,320,595 B2
(45) Date of Patent: May 3, 2022

(54) OPTICAL DEVICE THAT INCLUDES OPTICAL MODULATOR, AND OPTICAL TRANSCEIVER

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/141,288

(22) Filed: Jan. 5, 2021

(65) Prior Publication Data

US 2021/0278597 A1 Sep. 9, 2021

(30) Foreign Application Priority Data

Mar. 5, 2020 (JP) .............................. JP2020-037571

(51) Int. Cl.
| | |
|---|---|
| G02B 6/293 | (2006.01) |
| G02F 1/21 | (2006.01) |
| G02B 6/12 | (2006.01) |
| G02F 1/225 | (2006.01) |

(52) U.S. Cl.
CPC ..... *G02B 6/29353* (2013.01); *G02B 6/12019* (2013.01); *G02F 1/212* (2021.01); *G02F 1/225* (2013.01)

(58) Field of Classification Search
None
See application file for complete search history.

(56) References Cited

U.S. PATENT DOCUMENTS

| | | | |
|---|---|---|---|
| 2004/0184755 A1 | 9/2004 | Sugiyama et al. | |
| 2007/0280578 A1* | 12/2007 | Glebov | G02F 1/0356 385/2 |
| 2008/0226215 A1 | 9/2008 | Aoki et al. | |
| 2009/0202198 A1 | 8/2009 | Sugiyama | |
| 2014/0241659 A1* | 8/2014 | Fukuda | G02F 1/2257 385/3 |
| 2017/0357140 A1* | 12/2017 | Goodwill | G02B 6/29352 |
| 2018/0039151 A1* | 2/2018 | Doerr | H04B 10/516 |

FOREIGN PATENT DOCUMENTS

| | | |
|---|---|---|
| CN | 110441928 A * | 11/2019 |
| JP | 2008-224740 | 9/2008 |
| JP | 2009-186881 | 8/2009 |

* cited by examiner

*Primary Examiner* — Chad H Smith (74) *Attorney, Agent, or Firm* — Staas & Halsey LLP (57) ABSTRACT

An optical device includes: a substrate; an optical waveguide that forms a Mach-Zehnder interferometer; a signal electrode; and a ground electrode. The optical waveguide is placed between the signal electrode and the ground electrode. An electric field is generated in a direction along a surface of the substrate when a voltage is applied between the signal electrode and the ground electrode. The optical waveguide includes a first waveguide through which input light propagates, a curved waveguide which is optically coupled to the first waveguide, and a second waveguide which is optically coupled to the curved waveguide. The signal electrode includes first and second electrodes that are respectively placed near the first and second waveguides. An electric signal is supplied to the first electrode, and an inverted electric signal is supplied to the second electrode.

7 Claims, 10 Drawing Sheets

FIG. 1

Related Art

<FIRST WAVEGUIDE SECTION>

FIG. 7B

<SECOND WAVEGUIDE SECTION>

OPTICAL DEVICE THAT INCLUDES OPTICAL MODULATOR, AND OPTICAL TRANSCEIVER

CROSS-REFERENCE TO RELATED APPLICATION

This application is based upon and claims the benefit of priority of the prior Japanese Patent Application No. 2020-037571, filed on Mar. 5, 2020, the entire contents of which are incorporated herein by reference.

FIELD

The embodiments discussed herein are related to an optical device that includes an optical modulator and to an optical transceiver.

BACKGROUND

Figure 1:
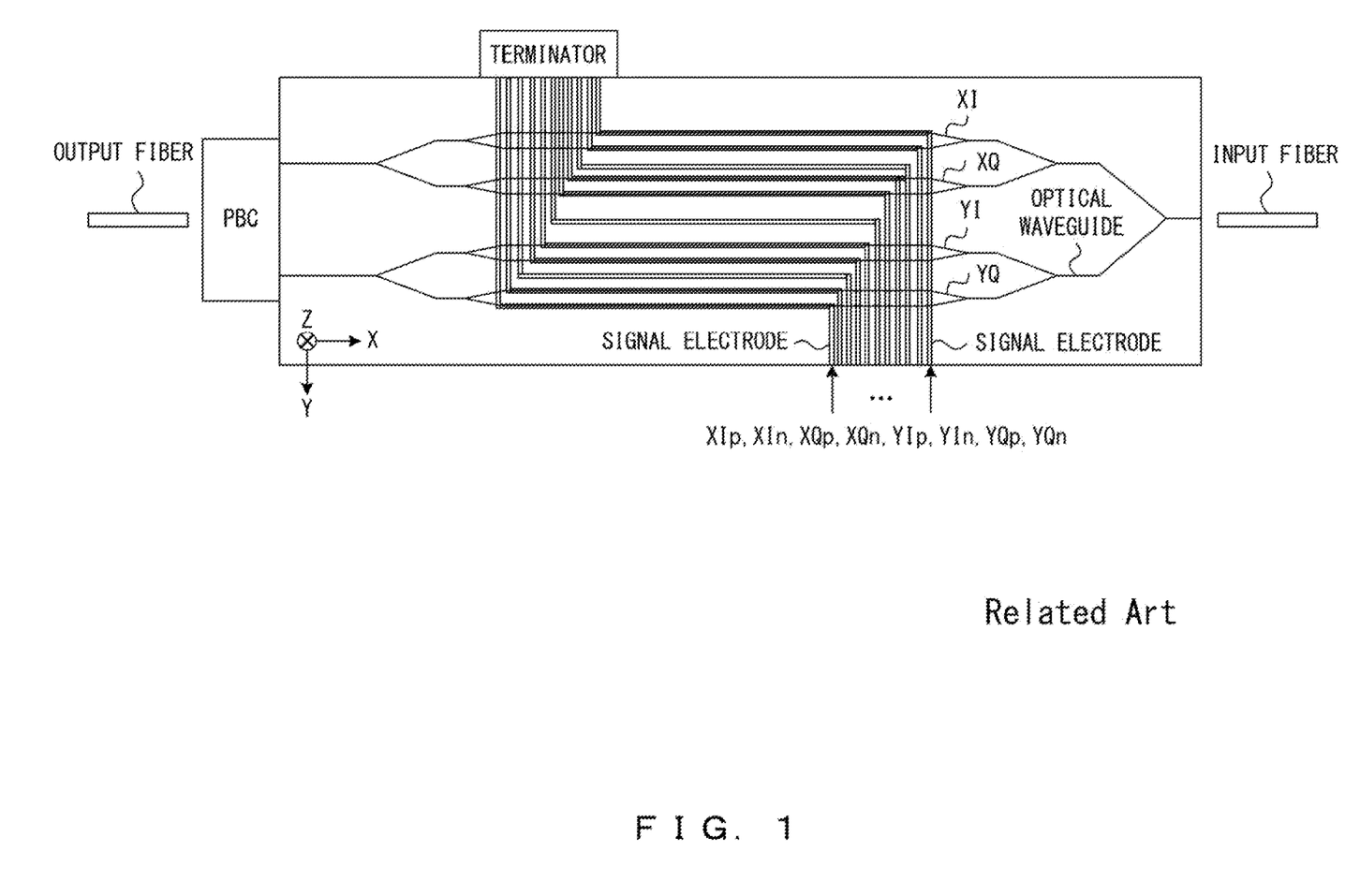
FIG. 1 illustrates an example of a conventional optical device.

FIG. 1 illustrates an example of a conventional optical modulator. In this example, the optical modulator generates a polarization multiplexed optical signal. Accordingly, the optical modulator includes a pair of parent Mach-Zehnder interferometers. Each of the parent Mach-Zehnder interferometers includes a pair of Mach-Zehnder interferometers.

The optical modulator is formed on a LN substrate (or LN chip). Thus, the Mach-Zehnder interferometers are configured by forming optical waveguides in the LN substrate. In this example, the LN substrate is a Z-cut LN substrate. In this case, signal electrodes are formed over the optical waveguides forming the Mach-Zehnder interferometers.

In the above optical modulator, when electric signals are supplied to the signal electrodes, electric fields are generated in a direction perpendicular to the surface of the substrate (i.e., Z direction). These electric fields change the refractive indexes of the optical waveguides formed under the signal electrodes, thereby changing the phases of light. Thus, desired modulated optical signals can be generated by appropriately adjusting the phases of light propagating through the Mach-Zehnder interferometers by means of electric signals.

In this example, the electric signals for driving the optical modulators are differential signals. The differential signals each include a positive signal and a negative signal having polarities different from each other. In this example, the optical modulator includes a XI modulator, a XQ modulator, a YI modulator, and a YQ modulator. In this case, the XI modulator is supplied with a pair of electric signals XIp and XIn, the XQ modulator is supplied with a pair of electric signals XQp and XQn, the YI modulator is supplied with a pair of electric signals YIp and YIn, and the YQ modulator is supplied with a pair of electric signals YQp and YQn.

Each of the electric signals propagates through a corresponding signal electrode and is terminated by an RF terminator. In this example, electric signals supplied to signal electrodes each propagate in the same direction at substantially the same velocity as light propagating through a corresponding optical waveguide. In this case, the phase of light propagating through each of the Mach-Zehnder interferometers changes in accordance with the electric signal, and modulated optical signals are generated.

Meanwhile, a known configuration is one wherein the voltage of an electric signal for driving an optical modulator (i.e., drive voltage) is decreased to reduce power consumption of the optical modulator. However, decreasing the drive voltage involves increasing the length of a region in which light and the electric signal interact with each other (i.e., interaction length). In the meantime, increasing the interaction length in the configuration depicted in FIG. 1 will extend the length of the LN substrate forming the optical modulator. When doing so in the example depicted in FIG. 1, the length of the LN substrate will be increased in the lateral direction (or the X direction depicted in FIG. 1). As a result, the size of a package for accommodating the optical modulator will be increased.

Figure 2:
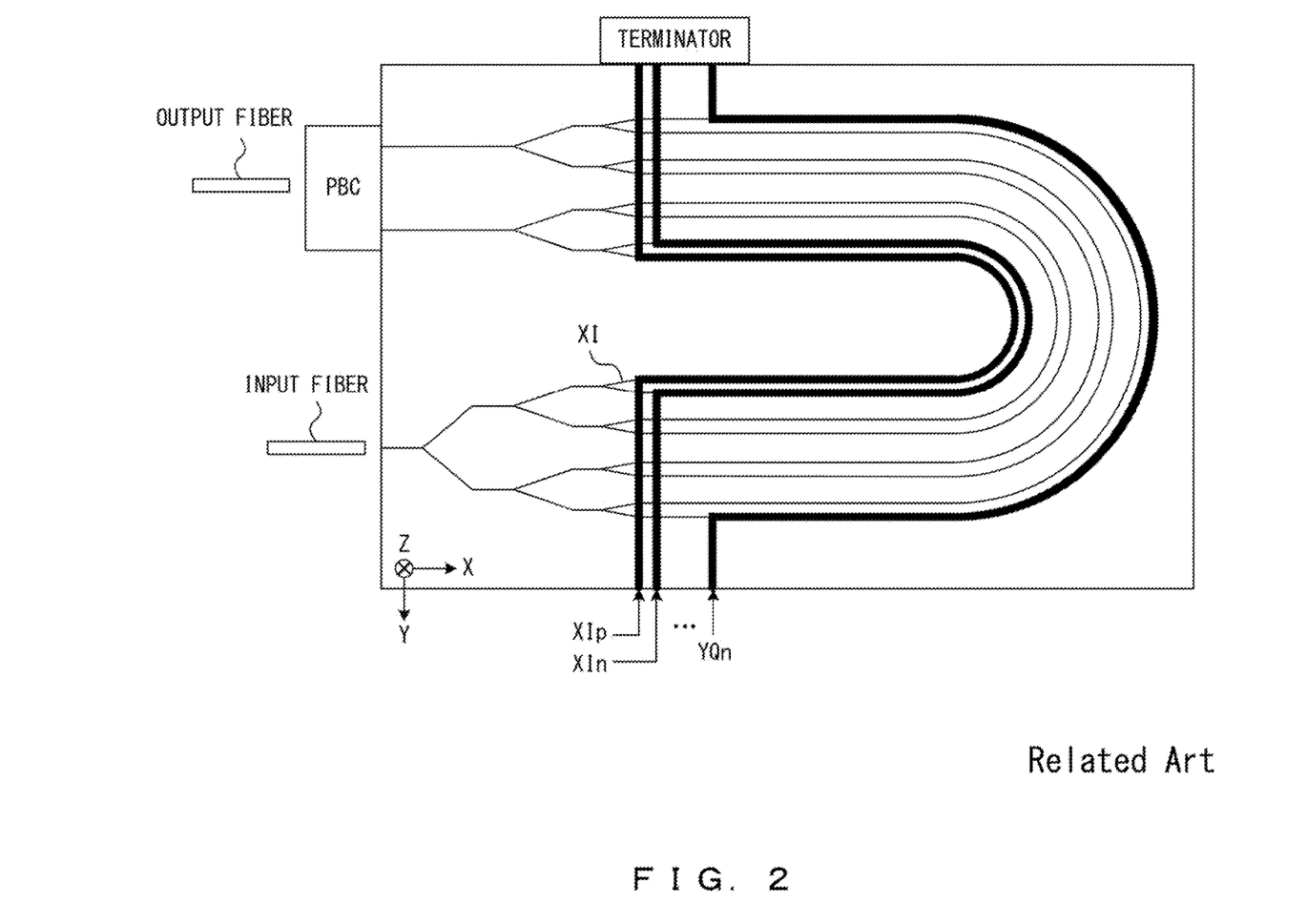
FIG. 2 illustrates another example of a conventional optical device.

This problem can be solved or alleviated by an optical waveguide having a fold-back shape in a LN substrate, as depicted in, for example, FIG. 2. In particular, in the optical modulator depicted in FIG. 2, light and an electric signal interact with each other for both an optical waveguide through which light propagates in the X direction and an optical waveguide through which light propagates in the –X direction, thereby substantially extending the interaction length. As a result, the drive voltage can be decreased without extending the length of the LN substrate.

An optical device having a fold-back optical waveguide on a substrate is described in, for example, U.S. 2004/0184755. Techniques relevant to the present application are described in U.S. 2008/0226215, Japanese Laid-open Patent Publication No. 2009-186881, and Japanese Laid-open Patent Publication No. 2008-224740.

In an optical modulator provided with Mach-Zehnder interferometers in a Z-cut LN substrate, differential electric signals are supplied to pairs of optical waveguides forming Mach-Zehnder interferometers, as depicted in FIGS. 1 and 2. For example, the XI modulator depicted in FIG. 2 may be driven by the pair of electric signals XIp and XIn. In this case, the phase and intensity of the pair of electric signals XIp and XIn need to be accurately adjusted. However, it will be difficult to design a circuit such that the phase and intensity of a pair of electric signals that arrive at a Mach-Zehnder interferometer are appropriately adjusted when the rate of transmission data is high. Chirps will occur in a modulated optical signal when the phase and intensity of a pair of electric signals are not appropriately adjusted. Thus, the quality of the transmission signal will deteriorate.

SUMMARY

According to an aspect of the embodiments, an optical device includes: a substrate; an optical waveguide that forms a Mach-Zehnder interferometer in a surface region of the substrate; a signal electrode that is formed on the substrate; and a ground electrode that is formed on the substrate. The optical waveguide is placed between the signal electrode and the ground electrode. The substrate has properties such that an electric field is generated in a direction along a surface of the substrate when a voltage is applied between the signal electrode and the ground electrode. The optical waveguide includes a first waveguide through which input light propagates in a first direction, a curved waveguide which is optically coupled to the first waveguide and guides the input light in a second direction that is different from the first direction, and a second waveguide which is optically coupled to the curved waveguide. The signal electrode includes a first electrode that is placed near the first waveguide, and a second electrode that is placed near the second waveguide. A first electric signal in a differential signal for driving the Mach-Zehnder interferometer is supplied to the first electrode, and a second electric signal in the differential signal is supplied to the second electrode.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 3:
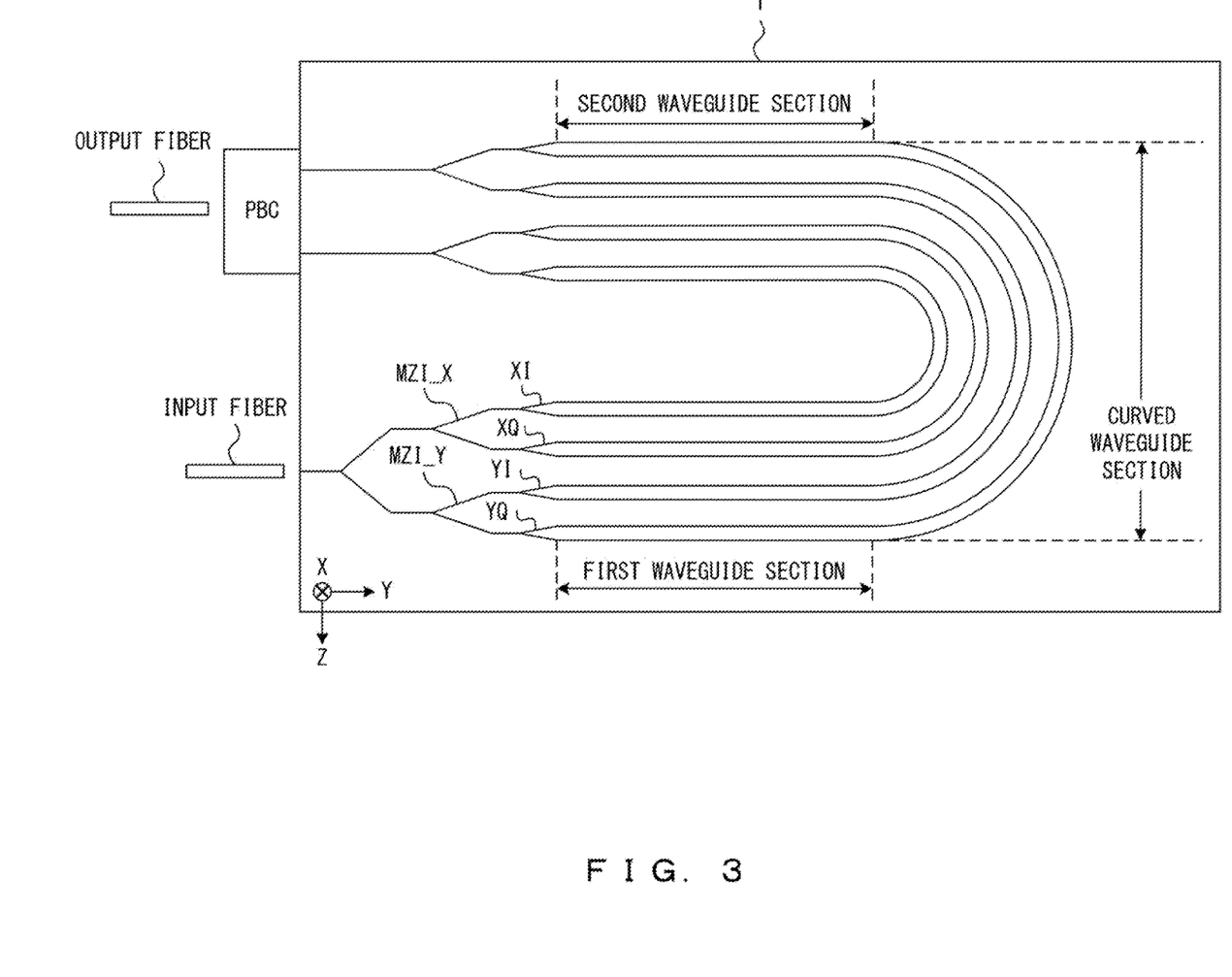
FIG. 3 illustrates an example of optical waveguides forming an optical modulator in accordance with embodiments of the invention.

FIG. 3 illustrates an example of optical waveguides forming an optical modulator in accordance with embodiments of the invention. In this example, the optical modulator is implemented on a lithium niobate (LN: LiNbO3) substrate 1. Lithium niobate has high electro-optic coefficients. An optical waveguide with low loss can be formed by diffusing Ti or the like in lithium niobate. Thus, LN substrates are widely used to implement optical devices such as optical modulators.

As depicted in FIG. 3, the optical modulator includes a pair of parent Mach-Zehnder interferometers MZI_X and MZI_Y. Each of the parent Mach-Zehnder interferometers includes a pair of Mach-Zehnder interferometers. In particular, the parent Mach-Zehnder interferometer MZI_X includes a pair of Mach-Zehnder interferometers XI and XQ. The parent Mach-Zehnder interferometer MZI_Y includes a pair of Mach-Zehnder interferometers YI and YQ.

The Mach-Zehnder interferometers are formed parallel to, or substantially parallel to, each other. Each of the Mach-Zehnder interferometers includes a first waveguide section, a curved waveguide section, and a second waveguide section. The first waveguide section is formed such that input light propagates through this section in a first direction (the direction from left to right in FIG. 3). The curved waveguide section is optically coupled to the first waveguide section and guides input light from the first waveguide section in a direction different from the first direction (the direction from right to left in FIG. 3). The second waveguide section is optically coupled to the curved waveguide section. In this example, the first and second waveguide sections are formed such that light propagates through these sections in directions opposite to each other. Thus, the curved waveguide section guides light received via the first waveguide section to the second waveguide section such that the light travels in the opposite direction. Accordingly, the curved waveguide section may be referred to as a "fold-back section".

When optical waveguides are formed in the LN substrate 1 as described above, an input port and an output port are provided on the same edge of the LN substrate 1. In FIG. 3, an input port and an output port are provided along the left edge of the LN substrate 1.

Continuous wave light input via the input fiber is guided to the parent Mach-Zehnder interferometers MZI_X and MZI_Y. The continuous wave light in the parent Mach-Zehnder interferometer MZI_X is guided to the Mach-Zehnder interferometers XI and XQ. The continuous wave light in the parent Mach-Zehnder interferometer MZI_Y is guided to the Mach-Zehnder interferometers YI and YQ. The continuous wave light passing through the Mach-Zehnder interferometers is modulated by an electric signal applied to a signal electrode (not illustrated). As a result, the parent Mach-Zehnder interferometer MZI_X generates a modulated optical signal X, and the parent Mach-Zehnder interferometer MZI_Y generates a modulated optical signal Y. The modulated optical signals X and Y are combined by a polarization beam combiner (PBC) and guided to the output fiber.

Figure 4:
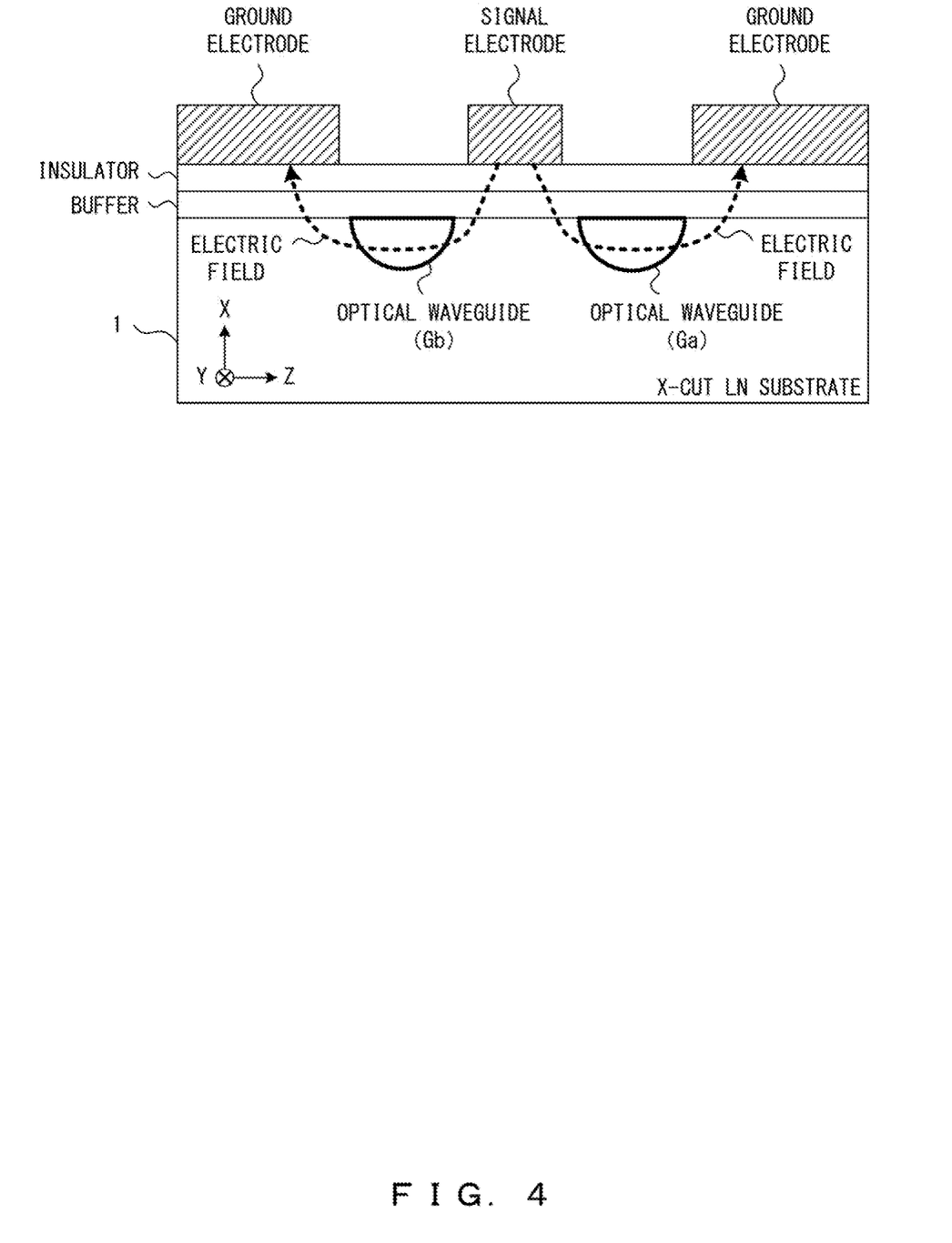
FIG. 4 illustrates electric fields generated by an electric signal.

The optical waveguides are formed in a surface region of the LN substrate 1. As an example, the optical waveguides may be formed by diffusing Ti or the like in the surface region of the LN substrate 1, as depicted in FIG. 4. Note that optical waveguides Ga and Gb depicted in FIG. 4 are a pair of optical waveguides forming a Mach-Zehnder interferometer.

In this example, the LN substrate 1 is a X-cut LN substrate. Accordingly, a signal electrode is formed over a region between a pair of optical waveguides forming a Mach-Zehnder interferometer. In the example depicted in FIG. 4, a signal electrode is formed over a region between the optical waveguides Ga and Gb. Meanwhile, ground electrodes are formed within other regions on the surface of the LN substrate 1. Thus, the signal electrode and the ground electrode are formed such that a corresponding optical waveguide is placed between them. A buffer layer may be formed on the surface of the LN substrate 1. An insulation layer may be placed between the buffer layer and the electrodes.

When a voltage is applied between the signal electrode and the ground electrode in the optical device, an electric field is generated in the surface region of the LN substrate 1. In this case, an electric field is generated in a direction along the surface of the LN substrate 1, since the LN substrate 1 is a X-cut LN substrate. Thus, in the example depicted in FIG. 4, an electric field is generated in the +Z direction in the optical waveguide Ga, and an electric field is generated in the −Z direction in the optical waveguide Gb. Accordingly, the directions of the electric fields generated in the optical waveguides Ga and Gb are opposite to each other. These electric fields respectively change the refractive indexes (or optical path lengths) of the optical waveguides Ga and Gb and respectively change the phase of light to be output from the optical waveguides.

Figure 5:
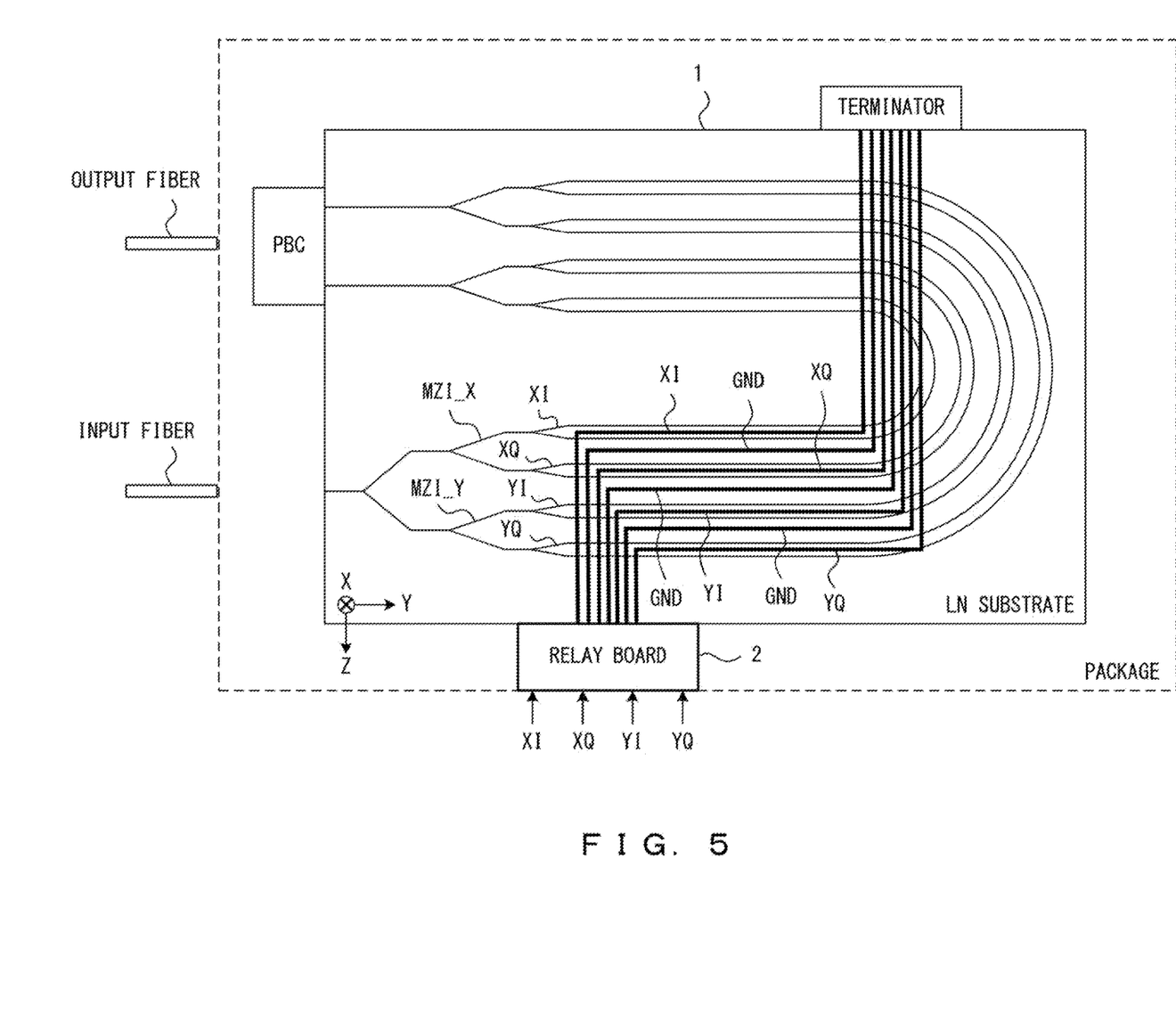
FIG. 5 illustrates an example of an optical modulator formed using a X-cut LN substrate.

FIG. 5 illustrates an example of an optical modulator formed using a X-cut LN substrate. The optical waveguides formed in the LN substrate 1 depicted in FIG. 5 are substantially the same as those depicted in FIG. 3. The LN substrate 1 on which the optical modulator is implemented is accommodated in a package.

A relay board 2 propagates electric signals from a driver circuit (not illustrated) to the LN substrate 1. The electric signals supplied from the driver circuit to the LN substrate 1 include a signal XI, a signal XQ, a signal YI, and a signal YQ. In addition, a ground voltage GND is supplied from the driver circuit to the LN substrate 1 via the relay board 2.

Signal electrodes and ground electrodes are formed on the surface of the LN substrate 1. The signal electrodes include an electrode XI through which the signal XI propagates, an electrode XQ through which the signal XQ propagates, an electrode YI through which the signal YI propagates, and an electrode YQ through which the signal YQ propagates. The electrodes XI, XQ, YI, and YQ are respectively formed for Mach-Zehnder interferometers XI, XQ, YI, and YQ. In particular, as described above by referring to FIG. 4, the electrodes XI, XQ, YI, and YQ are each formed over a region between a pair of optical waveguides forming a corresponding Mach-Zehnder interferometer. In this example, signal electrodes are provided for the first waveguide sections depicted in FIG. 3 and each formed along optical waveguides forming a corresponding Mach-Zehnder interferometer. The signal electrodes are terminated by an RF terminator.

Ground electrodes GDN are formed between the signal electrodes. In particular, a ground electrode GND is formed between each of a pair of electrodes XI and XQ, a pair of electrodes XQ and YI, and a pair of electrodes YI and YQ. Ground electrodes are also formed within other regions on the surface of the LN substrate 1, although not illustrated in the drawings for visibility.

Continuous wave light is input to the optical modulator via an input fiber. The signals XI, XQ, YI, and YQ are supplied from a driver circuit (not illustrated). Then, the Mach-Zehnder interferometer MZI_X modulates the continuous wave light with the signals XI and XQ, thereby generating a modulated optical signal X. The Mach-Zehnder interferometer MZI_Y modulates the continuous wave light with the signals YI and YQ, thereby generating a modulated optical signal Y. The modulated optical signals X and Y are combined by a polarization beam combiner (PBC) and guided to an output fiber.

As described above, in the optical modulator formed using a X-cut LN substrate, one signal electrode is formed for each Mach-Zehnder interferometer, and one electric signal is supplied to the signal electrodes. Thus, differential signals for driving the Mach-Zehnder interferometers do not need to be generated.

However, in the configuration depicted in FIG. 5, the signal electrodes are formed only for the first waveguide section depicted in FIG. 3. Hence, the lengths of regions in which light and an electric signal interact with each other (i.e., interaction lengths) may be small, and thus it is difficult to reduce the drive voltage.

If the signal electrode is formed not only for the first waveguide section but also for the second waveguide section, as in the optical modulator depicted in FIG. 2, the interaction length can be longer. However, when this configuration is applied to the optical modulator depicted in FIG. 5, the effect of an electric field generated in the first waveguide section and the effect of an electric field generated in the second waveguide section cancel each other. For example, it is assumed that an electric field of +Z direction is generated in an optical waveguide Ga and an electric field of −Z direction is generated in an optical waveguide Gb, as depicted in FIG. 4, in a certain Mach-Zehnder interferometer in the first waveguide section. In this case, an electric field of −Z direction is generated in the optical waveguide Ga and an electric field of +Z direction is generated in the optical waveguide Gb in that Mach-Zehnder interferometer in the second waveguide section. Hence, the electro-optical effects generated in the first waveguide section and the electro-optical effects generated in the second waveguide section cancel each other. Thus, when the LN substrate 1 is a X-cut LN substrate, it is not preferable for signal electrodes to each extend from a first waveguide section to a second waveguide section.

EMBODIMENTS

Figure 6:
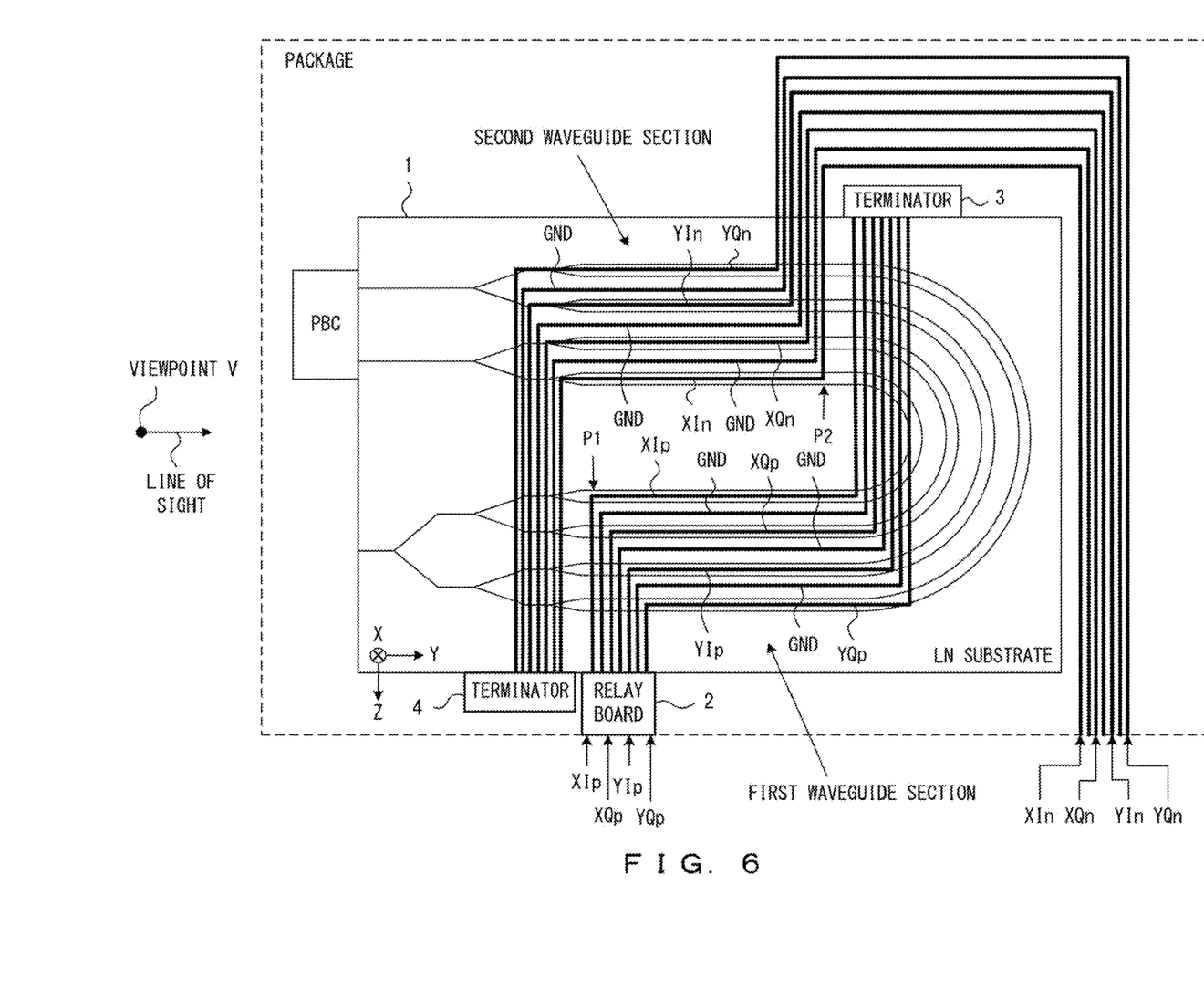
FIG. 6 illustrates an example of an optical device in accordance with embodiments of the invention.

FIG. 6 illustrates an example of an optical device in accordance with embodiments of the invention. In this example, the optical device is an optical modulator that generates a polarization multiplexed optical signal. The LN substrate 1 in FIG. 6 is a X-cut LN substrate and substantially the same as that in FIG. 5. The optical waveguides formed in the surface region of the LN substrate 1 depicted in FIG. 6 are substantially the same as those depicted in FIG. 5. Thus, parent Mach-Zehnder interferometers MZI_X and MZI_Y are formed in the LN substrate 1, as depicted in FIG. 3. The parent Mach-Zehnder interferometer MZI_X includes a pair of Mach-Zehnder interferometers XI and XQ. The parent Mach-Zehnder interferometer MZI_Y includes a pair of Mach-Zehnder interferometers YI and YQ. Each of the Mach-Zehnder interferometers includes a first waveguide section, a curved waveguide section, and a second waveguide section.

The optical modulator depicted in FIG. 6 is provided with two signal electrodes for each of the Mach-Zehnder interferometers. In particular, signal electrodes XIp and XIn are provided for the Mach-Zehnder interferometer XI, signal electrodes XQp and XQn are provided for the Mach-Zehnder interferometer XQ, signal electrodes YIp and YIn are provided for the Mach-Zehnder interferometer YI, and signal electrodes YQp and YQn are provided for the Mach-Zehnder interferometer YQ. The signal electrode XIp is formed for the first waveguide section of the Mach-Zehnder interferometer XI, and the signal electrode XIn is formed for the second waveguide section of the Mach-Zehnder interferometer XI. Similarly, the signal electrode XQp is formed for the first waveguide section of the Mach-Zehnder interferometer XQ, and the signal electrode XQn is formed for the second waveguide section of the Mach-Zehnder interferometer XQ. The signal electrode YIp is formed for the first waveguide section of the Mach-Zehnder interferometer YI, and the signal electrode YIn is formed for the second waveguide section of the Mach-Zehnder interferometer YI. The signal electrode YQp is formed for the first waveguide section of the Mach-Zehnder interferometer YQ, and the signal electrode YQn is formed for the second waveguide section of the Mach-Zehnder interferometer YQ.

A driver circuit (not illustrated) generates electric signals for driving the Mach-Zehnder interferometers. In this example, the electric signals for driving the Mach-Zehnder interferometers are differential signals. Specifically, the driver circuit generates a differential signal XIp/XIn for driving the Mach-Zehnder interferometer XI, a differential signal XQp/XQn for driving the Mach-Zehnder interferometer XQ, a differential signal YIp/YIn for driving the Mach-Zehnder interferometer YI, and a differential signal YQp/YQn for driving the Mach-Zehnder interferometer YQ. Positive electric signals XIp, XQp, YIp, and YQp are respectively supplied to the electrodes XIp, XQp, YIp, and Yqp which are formed in the first waveguide section. Negative electric signals XIn, XQn, YIn, and YQn are respectively supplied to the electrodes XIn, XQn, YIn, and YQn which are formed in the second waveguide section.

Electric signals that propagate through the electrodes XIp, XQp, YIp, and YQp are terminated by an RF terminator 3. Electric signals that propagate through the electrodes XIn, XQn, YIn, and YQn are terminated by an RF terminator 4.

Ground electrodes are formed between the signal electrodes. In particular, a ground electrode is formed between each of a pair of electrodes XIp and XQp, a pair of electrodes XQp and YIp, and a pair of electrodes YIp and YQp. A ground electrode is also formed between each of a pair of electrodes XIn and XQn, a pair of electrodes XQn and YIn, and a pair of electrodes YIn and YQn. In addition, ground electrodes are also formed between the parent Mach-Zehnder interferometers. Ground electrodes area also formed within other regions on the surface of the LN substrate 1, although not illustrated in the drawings for visibility.

Continuous wave light is input to the optical modulator via an input fiber. The continuous wave light is guided to the Mach-Zehnder interferometers XI, XQ, YI, and YQ. Signals XIp, XQp, YIp, YQp, XIn, XQn, YIn, and YQn are supplied from a driver circuit (not illustrated). Thus, the Mach-Zehnder interferometers XI, XQ, YI, and YQ each modulate continuous wave light. The following describes modulation implemented by the Mach-Zehnder interferometer XI.

The signals XIp and XIn are supplied to the Mach-Zehnder interferometer XI. In particular, the signal XIp is supplied to the electrode XIp formed in the first waveguide section of the Mach-Zehnder interferometer XI. The signal XIn is supplied to the electrode XIn formed in the second waveguide section of the Mach-Zehnder interferometer XI.

Figure 7A:
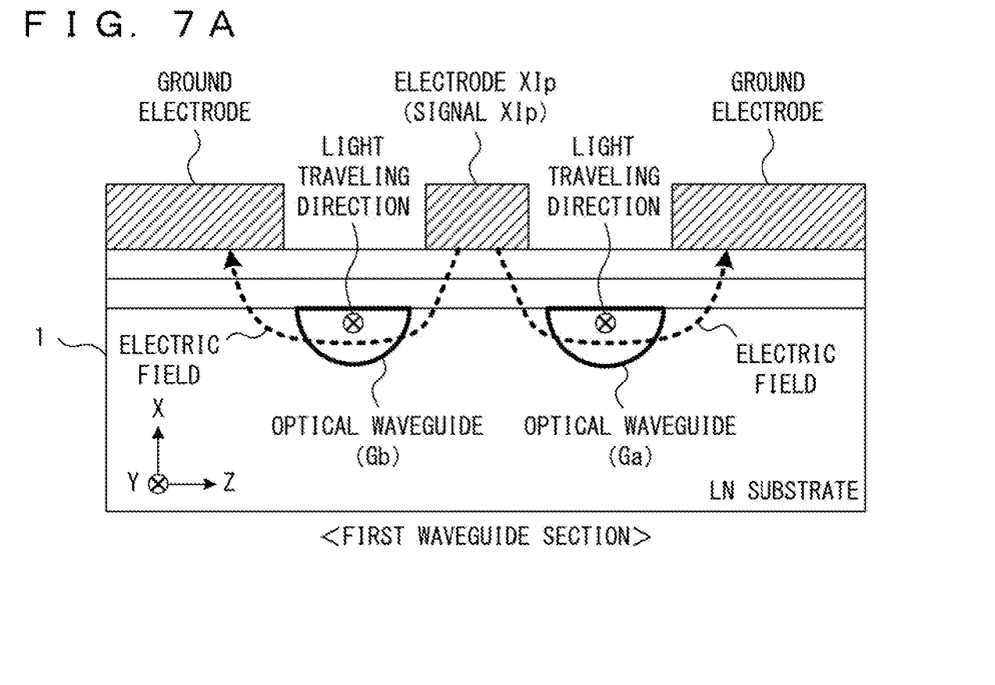
FIGS. 7A and 7B illustrate electric fields generated in an optical device in accordance with embodiments of the invention.
Figure 7B:
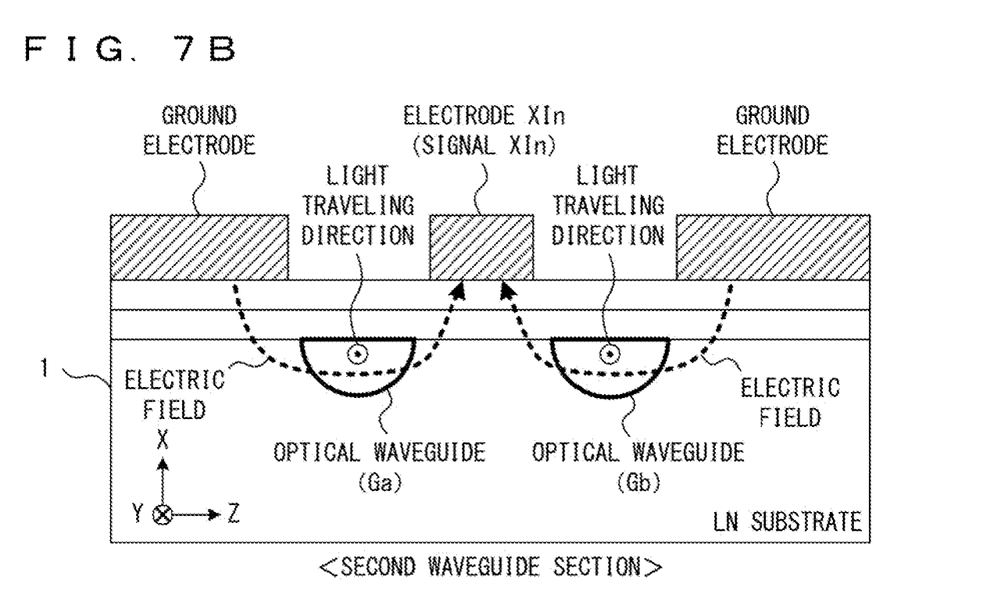

FIGS. 7A and 7B illustrate an electric field generated in an optical device in accordance with embodiments of the invention. Note that FIGS. 7A and 7B depict cross sections of the LN substrate 1 provided when the optical modulator is seen from a viewpoint V indicated in FIG. 6. FIG. 7A depicts a cross section of a region in which the first waveguide section of the Mach-Zehnder interferometer XI is formed. FIG. 7B depicts a cross section of a region in which the second waveguide section of the Mach-Zehnder interferometer XI is formed. As depicted in FIGS. 7A and 7B, the Mach-Zehnder interferometer XI is formed from a pair of optical waveguides Ga and Gb.

For the first waveguide section, a positive signal XIp is supplied to an electrode XIp formed over the Mach-Zehnder interferometer XI. The electric field depicted in FIG. 7A is generated by the positive signal XIp. In particular, an electric field traveling in the +Z direction is generated in the optical waveguide Ga, and an electric field traveling in the −Z direction is generated in the optical waveguide Gb.

For the second waveguide section, a negative signal XIn is supplied to an electrode XIn formed over the Mach-Zehnder interferometer XI. The negative signal XIn is obtained by inverting the positive signal XIp. Hence, an electric field in opposite orientation to the electric field generated by the positive signal XIp in the first waveguide section is generated in the second waveguide section. Thus, when the electric field depicted in FIG. 7A is generated in the first waveguide section, the electric field depicted in FIG. 7B is generated in the second waveguide section. Note that in FIG. 7A, the optical waveguide Gb is located to the left of the optical waveguide Ga, while in FIG. 7B, the optical waveguide Gb is located to the right of the optical waveguide Ga.

As described above, as with the first waveguide section, the second waveguide section is such that an electric field traveling in the +Z direction is generated in the optical waveguide Ga and an electric field traveling in the −Z direction is generated in the optical waveguide Gb. That is, the same electro-optical effect is generated in the first waveguide section and the second waveguide section. Hence, the electro-optical effect generated in the second waveguide section by the negative signal XIn enhances the electro-optical effect generated in the first waveguide section by the positive signal XIp. Accordingly, the electrode XIp to which the positive signal XIp is supplied is formed for the first waveguide section, and the electrode XIn to which the negative signal XIn obtained by inverting the positive signal XIp is supplied is formed for the second waveguide section, thereby substantially increasing the interaction length in the Mach-Zehnder interferometer XI. This is also true for the Mach-Zehnder interferometers XQ, YI, and YQ.

Increasing the interaction length in the Mach-Zehnder interferometer allows the drive voltage of a signal for driving the optical modulator to be decreased, thereby reducing the power consumption. The LN substrate 1 can be small in length since each of the Mach-Zehnder interferometers includes two waveguide sections disposed parallel to each other and a curved waveguide section coupling the two waveguide sections. Accordingly, the configuration depicted in FIG. 6 can downsize an optical modulator with low power consumption.

In the configuration depicted in FIG. 6, the electric signals for driving the optical modulator are differential signals. In this case, a pair of electric signals forming a differential signal are supplied to electrodes independent of each other and each act on a different region of optical waveguides. In particular, one of the electric signals (e.g., signal XIp) changes the refractive index of a first waveguide section, and the other electric signal (e.g., signal XIn) changes the refractive index of a second waveguide section. Hence, the phases and intensities of the pair of electric signals forming the differential signal do not need to be accurately adjusted. Thus, the optical modulator depicted in FIG. 6 can have a simplified design to supply electric signals to the Mach-Zehnder interferometers.

However, the modulation operation on the first waveguide section and the modulation operation on the second waveguide section need to be synchronous with each other. Input light passes the first waveguide section and is then guided to the second waveguide section via the curved waveguide section. Thus, the modulation operation on the first waveguide section is performed first, and then the modulation operation on the second waveguide section is performed. Hence, each of the signal electrodes is configured such that an electrode through which an electric signal propagates from the driver circuit to the second waveguide section is longer than an electrode through which an electric signal propagates from the driver circuit to the first waveguide section. For example, a conductor pattern (or wiring pattern) for propagating electric signals may be designed for the Mach-Zehnder interferometer X1 such that the difference between a time needed for a signal XIp to propagate from the driver circuit to a point P1 and a time needed for a signal XIn to propagate from the driver circuit to a point P2 substantially matches a time needed for light to propagate from the point P1 to the point P2 via the optical waveguides. Note that the conductor pattern for propagating electric signals from the driver circuit to the second waveguide section includes a wire between a package edge and an edge portion of the LN substrate 1, and this wire is formed on, for example, a relay board (not illustrated).

As described above, in the configuration depicted in FIG. 6, the conductor pattern for propagating electric signals to the second waveguide section is longer than the conductor pattern for propagating electric signals to the first waveguide section. In this regard, when the rate of data signals transmitted by the optical modulator is high, the longer an electrode is, the larger loss in a transmission signal will be. Thus, it is considered that in the configuration depicted in FIG. 6, the quality of an electric signal supplied to the second waveguide section is lower than an electric signal supplied to the first waveguide section.

Figure 8:
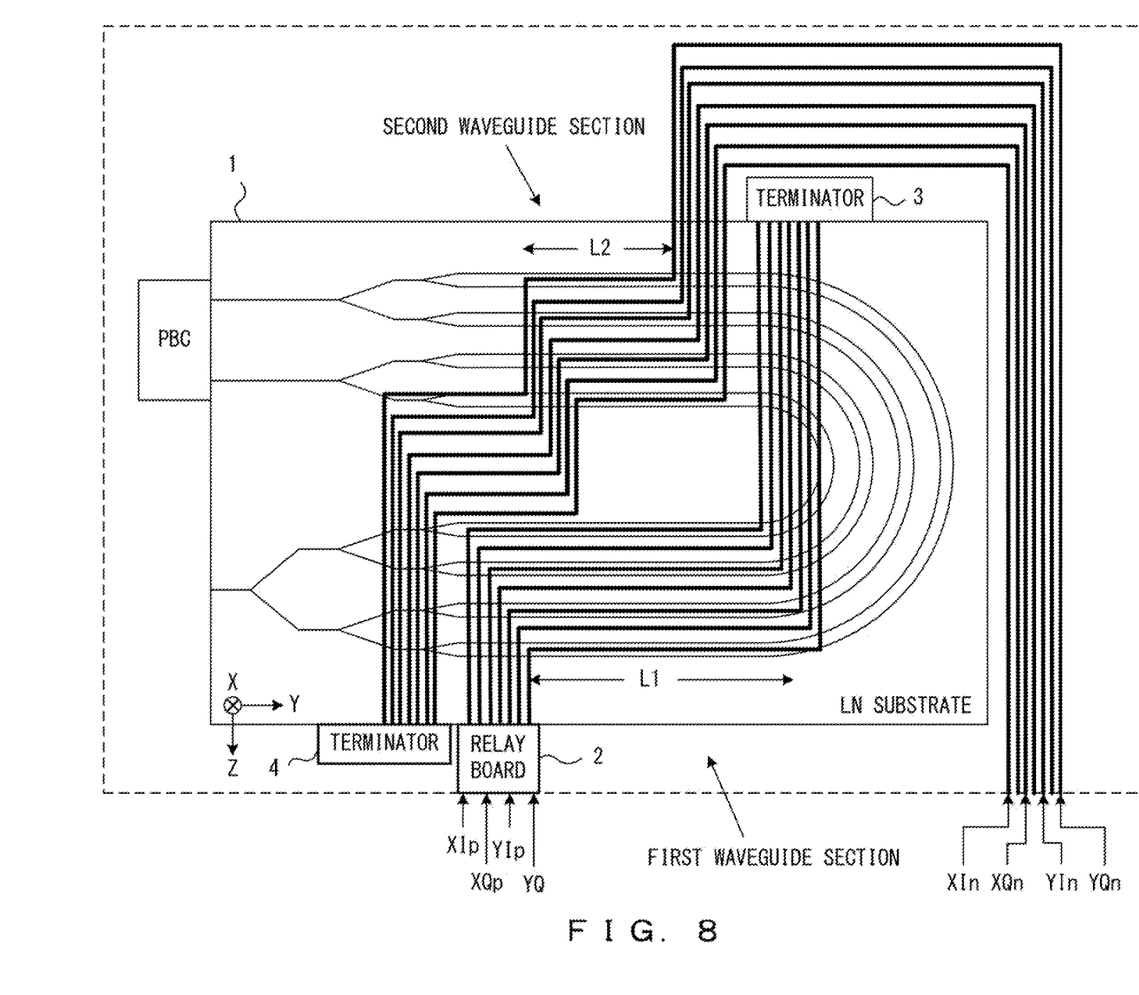
FIG. 8 illustrates a variation of an optical device depicted in FIG. 6.

Accordingly, the signal electrode for each of the Mach-Zehnder interferometers in the configuration depicted in FIG. 8 is formed such that the interaction length of the second waveguide section is less than that of the first waveguide section. In FIG. 8, electrodes XIp, XQp, YIp, and YQp and electrodes XIn, XQn, XIn, and YQn are formed such that interaction lengths L2 are less than interaction lengths L1. With this configuration, modulation using high-quality electric signals becomes dominant, thereby increasing the quality of a modulated optical signal generated by the optical modulator.

Figure 9:
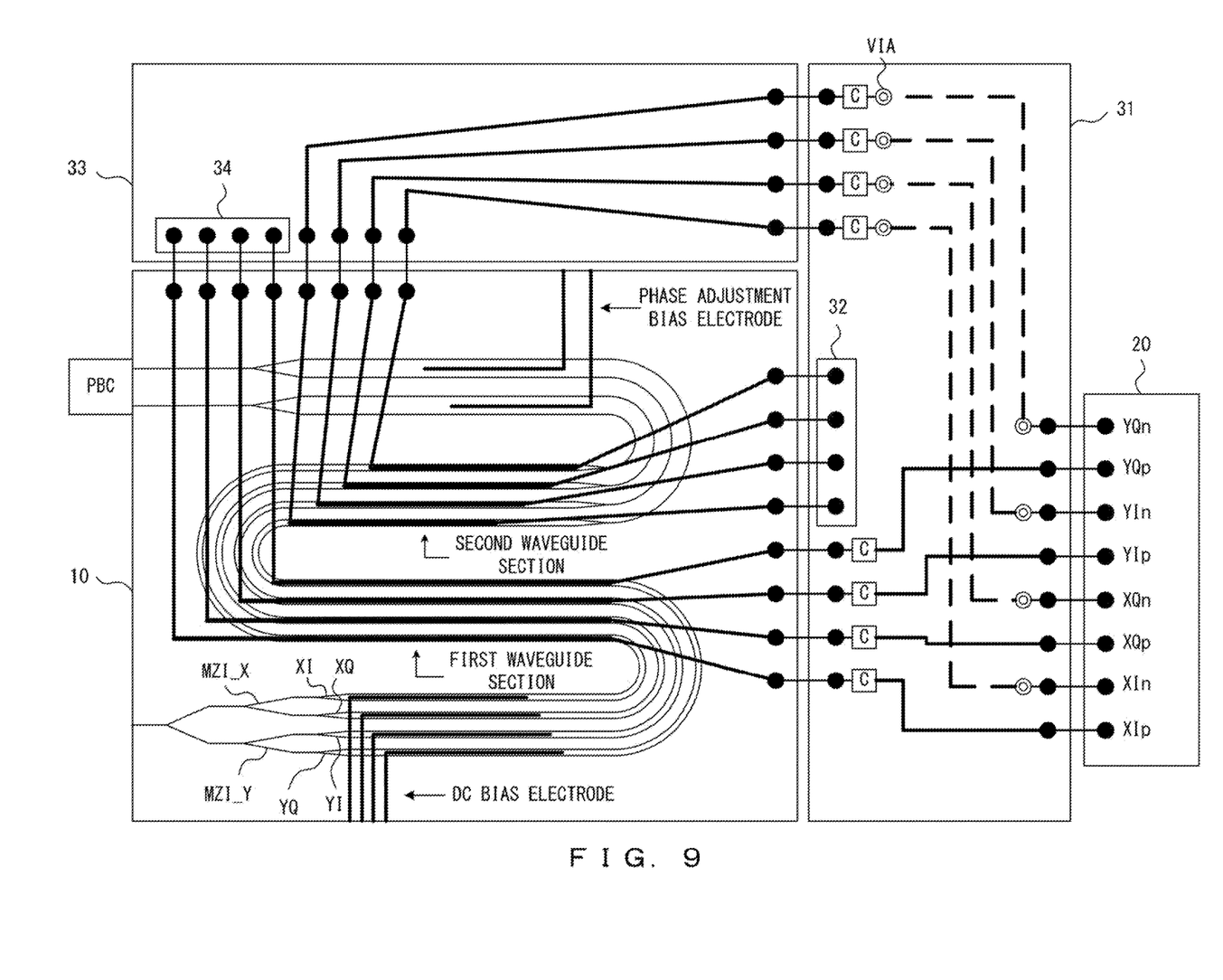
FIG. 9 illustrates another example of an optical device in accordance with embodiments of the invention.

FIG. 9 illustrates another example of an optical device in accordance with embodiments of the invention. The optical device depicted in FIG. 9 includes a modulator chip 10, a driver circuit 20, a relay board 31, and a relay board 33. The modulator chip 10, the driver circuit 20, the relay board 31, and the relay board 33 are accommodated in a package. An input fiber and an output fiber are connected to the package. The relay board 31 is a layered board (or multilayer board).

The modulator chip 10 is configured using a X-cut LN substrate. An optical modulator that generates a polarization multiplexed optical signal is implemented on the modulator chip 10. Optical waveguides in a surface region of the LN substrate form parent Mach-Zehnder interferometers MZI_X and MZI_Y, as in the configurations depicted in FIGS. 6 and 8. The parent Mach-Zehnder interferometer MZI_X includes a pair of Mach-Zehnder interferometers XI and XQ. The parent Mach-Zehnder interferometer MZI_Y includes a pair of Mach-Zehnder interferometers YI and YQ. In this example, each of the parent Mach-Zehnder interferometers XMI_X and MZI_Y generates a QPSK optical signal.

A DC bias electrode is provided for each of Mach-Zehnder interferometers XI, XQ, YI, and YQ. DC bias voltages for adjusting operation points of the Mach-Zehnder interferometers XI, XQ, YI, and YQ are applied to the DC bias electrodes. The DC bias voltages are generated by a control circuit (not illustrated).

A phase adjustment bias electrode is provided for each of the parent Mach-Zehnder interferometers MZI_X and MZI_Y. DC bias voltages each for adjusting a phase difference between the pair of Mach-Zehnder interferometers in a parent Mach-Zehnder interferometer are applied to the phase adjustment bias electrodes. The DC bias voltages are generated by a control circuit (not illustrated).

The driver circuit 20 generates electric signals for driving the optical modulator. Specifically, the driver circuit 20 generates electric signals for driving the Mach-Zehnder interferometers XI, XQ, YI, and YQ. The electric signals are differential signals. In particular, the differential signal supplied to the Mach-Zehnder interferometer XI is formed from a positive signal XIp and a negative signal XIn. The differential signal supplied to the Mach-Zehnder interferometer XQ is formed from a positive signal XQp and a negative signal XQn. The differential signal supplied to the Mach-Zehnder interferometer YI is formed from a positive signal YIp and a negative signal YIn. The differential signal supplied to the Mach-Zehnder interferometer YQ is formed from a positive signal YQp and a negative signal YQn.

The positive signals (XIp, XQp, YIp, YQp) to be supplied to the first waveguide section among the electric signals generated by the driver circuit 20 propagate through wires formed on the surface of the relay board 31 to pads formed in the vicinity of the modulator chip 10. Blocking capacitors for cutting DC components are provided on the wires. The blocking capacitors are denoted as "C" in FIG. 9. The wires are each electrically connected to a corresponding electrode formed on the modulator chip 10.

The negative signals (XIn, XQn, YIn, YQn) to be supplied to the second waveguide section among the electric signals generated by the driver circuit 20 propagate through wires formed in an inner layer of the relay board 31 to pads formed in the vicinity of the relay board 33. The wires formed in the inner layer are represented by dashed lines in FIG. 9. The wires formed on the surface and the wires formed in the inner layer are electrically connected to each other. The vias are represented by double circles in FIG. 9. Furthermore, blocking capacitors are also provided on these wires. These wires are each electrically connected to a corresponding wiring pattern formed on the relay board 33.

Wiring patterns for propagating negative signals to be supplied to the second waveguide section are formed on the relay board 33. These wiring patterns are each electrically connected to a corresponding electrode formed on the modulator chip 10.

In the modulator chip 10, positive signals XIp, XQp, YIp, and YQp are supplied to the first waveguide section of the corresponding Mach-Zehnder interferometers XIp, XQp, YIp, and YQp. These positive signals are terminated by an RF terminator 34 provided on the relay board 33.

In the modulator chip 10, negative signals XIn, XQn, YIn, and YQn are supplied to the second waveguide section of the corresponding Mach-Zehnder interferometers XIn, XQn, YIn, and YQn. These negative-electrode signals are terminated by an RF terminator 32 provided on the relay board 31.

In the optical device, pairs of positive signals and negative signals forming differential signals are output from the driver circuit 20 via terminals positioned close to each other. Meanwhile, a plurality of positive signals (XIp, XQp, YIp, YQp) and a plurality of negative signals (XIn, XQn, YIn, YQn) respectively need to be concentrated when being supplied to the modulator chip 10. Hence, the paths of the wires for propagation of the positive signals and the paths of the wires for propagation of the negative signals overlap each other.

Accordingly, in this example, a layered board is used as the relay board 31. Portions of the wires for propagating the negative signals are formed in the inner layer in the layered board. Accordingly, the negative signals propagate through the wires formed on the surface of the relay board 31 and the wires formed in the inner layer in the relay board 31.

As described above, the longer a wire from the driver circuit 20 to a Mach-Zehnder interferometer is, the lower the quality of an electric signal will be. Thus, the wiring patterns are designed such that at least either positive signals or negative signals propagate from the driver circuit 20 to the Mach-Zehnder interferometers by taking paths that are as short as possible. In this example, the wiring patterns are designed such that positive signals propagate from the driver circuit 20 to the Mach-Zehnder interferometers by taking paths that are as short as possible. Hence, in the relay board 31, the wires through which negative signals propagate are longer than the wires through which positive signals propagate.

In many cases, loss in wires formed in/on a layered board is larger than loss in wires formed on a single-layer board. Thus, when portions of the wires between the driver circuit 20 and the Mach-Zehnder interferometers are formed in/on the layered board (i.e., relay board 31), the wires formed in/on the layered board are preferably as short as possible. Accordingly, in this example, the relay board 33 is a single-layer board. When both the layered board (i.e., relay board 31) and the single-layer board (i.e., relay board 33) are provided with wires for propagating negative signals, the wires formed in/on the layered board will preferably be short, and the wires formed on the single-layer board will preferably be long.

In addition, the optical modulator depicted in FIG. 9 includes the four Mach-Zehnder interferometers XI, XQ, YI, and YQ, and in this regard, the skews of electric signals for driving these four Mach-Zehnder interferometers need to be appropriately adjusted. In particular, the lengths of time taken for the electric signals to propagate from the driver circuit 20 to the Mach-Zehnder interferometers need to be the same or substantially the same. In this case, for example, the signal electrodes on the LN substrate may be formed such that the lengths of the paths through which electric signals propagate are minimized. When doing so, the lengths of the signal electrodes formed on the LN substrate may be different. In this case, the skews are adjusted by appropriately adjusting the lengths of the wires formed on the relay board.

Figure 10:
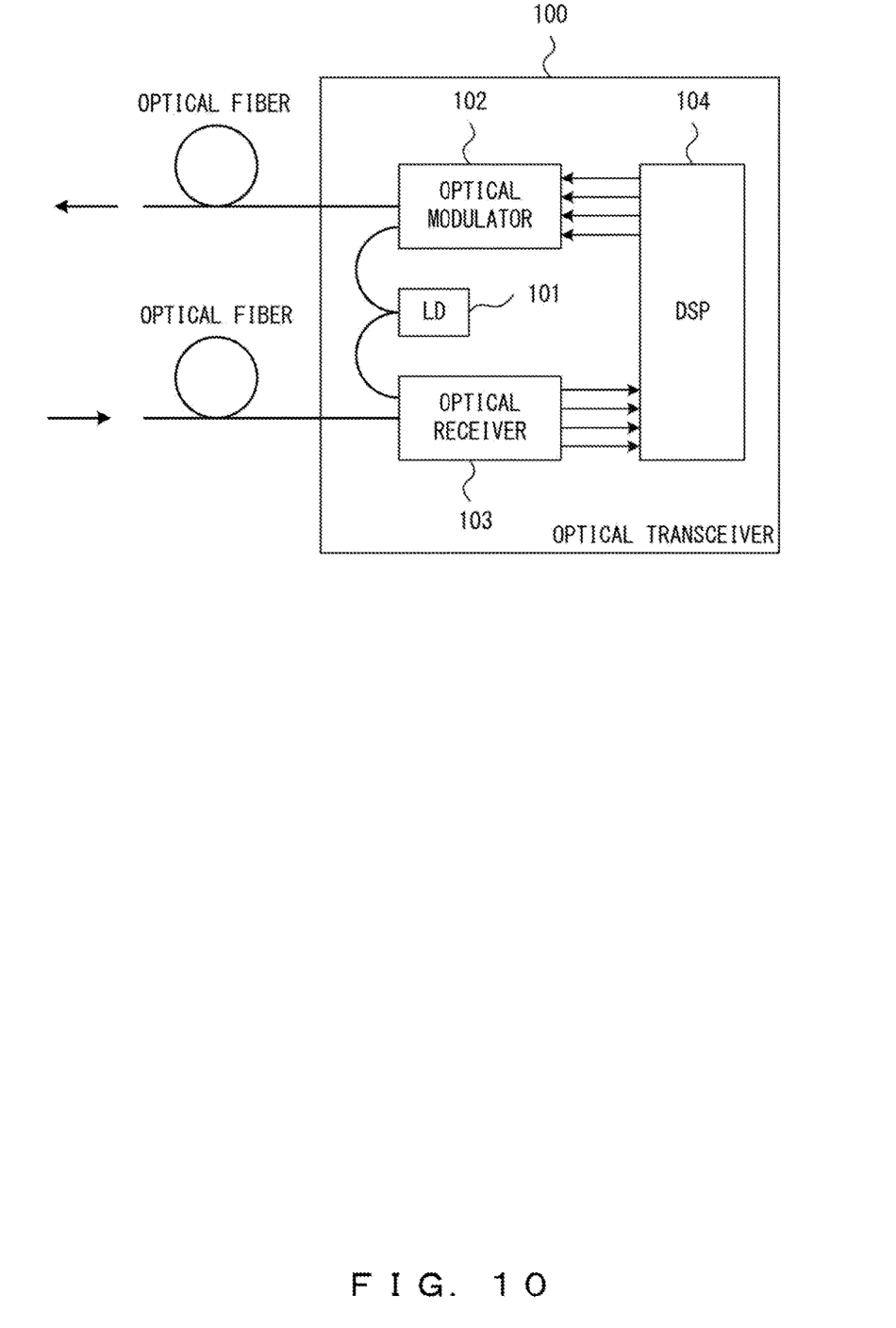
FIG. 10 illustrates an example of an optical transceiver in accordance with embodiments of the invention.

FIG. 10 illustrates an example of an optical transceiver in accordance with embodiments of the invention. An optical transceiver 100 includes a light source (LD) 101, an optical modulator 102, an optical receiver 103, and a digital signal processor (DSP) 104.

The light source 101 is, for example, a laser light source and generates continuous wave light of a specified frequency. The optical modulator 102 generates a modulated optical signal by modulating continuous wave light generated by the light source 101 with a transmission signal supplied from the DSP. For example, the optical modulator 102 may correspond to the optical device depicted in FIG. 6, 8, or 9. The optical receiver 103 is, for example, a coherent receiver and demodulates a received optical signal by using continuous wave light generated by the light source 101. The DSP 104 generates a transmission signal from data supplied from an application. This transmission signal is supplied to the optical modulator 102. The DSP 104 also recovers data from a received signal demodulated by the optical receiver 103.

Accordingly, the optical transceiver 100 includes the optical device in accordance with embodiments of the present invention as an optical modulator. Thus, both a reduction in power consumption of the optical transceiver and downsizing of the optical transceiver can be attained.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical device comprising:
   a substrate;
   an optical waveguide that forms a Mach-Zehnder interferometer in a surface region of the substrate;
   a first signal electrode that is formed on the substrate;
   a second signal electrode that is formed on the substrate; and
   a ground electrode that is formed on the substrate,
   wherein
   the substrate has properties such that an electric field is generated in a direction along a surface of the substrate when a voltage is applied between electrodes formed on the substrate,
   the optical waveguide includes
      a first waveguide through which input light propagates in a first direction,
      a curved waveguide which is optically coupled to the first waveguide and propagates the output light of the first waveguide, and
      a second waveguide which is optically coupled to the curved waveguide and guides the output light of the curved waveguide in a second direction that is different from the first direction,
   the first waveguide is formed between the first electrode and the ground electrode,
   the second waveguide is formed between the second electrode and the ground electrode, and
   a first electric signal in a differential signal for driving the Mach-Zehnder interferometer is supplied to the first electrode, and a second electric signal in the differential signal is supplied to the second electrode.

2. The optical device according to claim 1, wherein a wiring pattern between a driver circuit for generating the differential electric signal and the second electrode is longer than a wiring pattern between the driver circuit and the first electrode.

3. The optical device according to claim 1, wherein
   a region in which the second waveguide and the second electrode are parallel to each other is shorter than a region in which the first waveguide and the first electrode are parallel to each other.

4. The optical device according to claim 1,
   further comprising: one or more relay boards between a driver circuit for generating the differential electric signal and the substrate,
   wherein at least one of the one or more relay boards is a layered board.

5. The optical device according to claim 4, wherein
   in the layered board, a first wiring pattern provided between the driver circuit and the first electrode is formed only on a surface of the layered board, and
   in the layered board, a portion of a second wiring pattern provided between the driver circuit and the second electrode is formed in an inner layer in the layered board.

6. The optical device according to claim 5, wherein the first wiring pattern is shorter than the second wiring pattern.

7. An optical transceiver including an optical modulator and an optical receiver, wherein the optical modulator includes
   a substrate,
   an optical waveguide that forms a Mach-Zehnder interferometer in a surface region of the substrate,
   a first signal electrode that is formed on the substrate, a second signal electrode that is formed on the substrate; and a ground electrode that is formed on the substrate, wherein the substrate has properties such that an electric field is generated in a direction along a surface of the substrate when a voltage is applied between electrodes formed on the substrate, the optical waveguide includes
- a first waveguide through which input light propagates in a first direction,
- a curved waveguide which is optically coupled to the first waveguide and propagates the output light of the first waveguide, and
- a second waveguide which is optically coupled to the curved waveguide and guides the output light of the curved waveguide in a second direction that is different from the first direction, the first waveguide is formed between the first electrode and the ground electrode, the second waveguide is formed between the second electrode and the ground electrode, and a first electric signal in a differential signal for driving the Mach-Zehnder interferometer is supplied to the first electrode, and a second electric signal in the differential signal is supplied to the second electrode.

* * * * *